(12) United States Patent
Chang et al.

(10) Patent No.: US 7,796,337 B2
(45) Date of Patent: Sep. 14, 2010

(54) OPTICAL MICROSTRUCTURE PLATE AND FABRICATION MOLD THEREOF

(75) Inventors: Chia-Yang Chang, Hsinchu (TW);
Teng-Sheng Chen, Hsinchu (TW);
Hsiao-Wen Lee, Hsinchu (TW);
Sheng-Shin Guo, Taipei (TW)

(73) Assignee: VisEra Technologies Company Limited, Hsinchu (TW)

( * ) Notice: Subject to any disclaimer, the term of this patent is extended or adjusted under 35 U.S.C. 154(b) by 681 days.

(21) Appl. No.: 11/717,128

(22) Filed: Mar. 13, 2007

(65) Prior Publication Data

US 2008/0225390 A1    Sep. 18, 2008

(51) Int. Cl.
*G02B 27/10* (2006.01)

(52) U.S. Cl. .................................. 359/621; 359/619

(58) Field of Classification Search .................. 359/619, 359/621
See application file for complete search history.

(56) References Cited

U.S. PATENT DOCUMENTS 6,373,635 B1    4/2002    Fujimoto
6,618,200 B2 *  9/2003    Shimizu et al. ............. 359/619
6,777,767 B2    8/2004    Badehi
2005/0029640 A1 2/2005    Amano et al.

FOREIGN PATENT DOCUMENTS

| CN | 2552163 | 5/2003 |
|---|---|---|
| CN | 1172199 C | 10/2004 |
| CN | 1893012 | 1/2007 |
| JP | 2001-096636 | 4/2001 |
| TW | 466722 B | 12/2001 |

* cited by examiner

*Primary Examiner*—William C Choi
(74) *Attorney, Agent, or Firm*—Muncy, Geissler Olds & Lowe, PLLC (57) ABSTRACT

An optical microstructure plate and mold for fabricating the same is disclosed. The optical microstructure plate comprises a substrate. An optical microstructure element is formed on the substrate. A period alignment mark is disposed on the substrate to provide alignment for fabricating the optical microstructure element by a mold. A universal alignment mark is disposed on the substrate to provide alignment for bonding another plate therewith. Specifically, the mold comprises a concave within a mold substrate, a spoiler around the concave, and a buffer zone adjacent to the spoiler.

12 Claims, 9 Drawing Sheets

OPTICAL MICROSTRUCTURE PLATE AND FABRICATION MOLD THEREOF

BACKGROUND OF THE INVENTION

1. Field of the Invention

The invention relates to an optical microstructure plate and a mold for forming the same, and more particularly to an optical microstructure plate simultaneously having period alignment mark and universal mark.

2. Description of the Related Art

Many optical systems require multiple optical elements. Such required multiple optical elements include multiple refractive elements, multiple diffractive elements and refractive/diffractive hybrid elements. As the demand for optical components to be used in a wider variety of applications increases, the ability to efficiently produce such optical elements also increases. In forming such integrated multiple optical elements at a mass production level, the need for accurate alignment increases. Further, such alignment is critical when integrating more than one optical element.

Figure 1A:
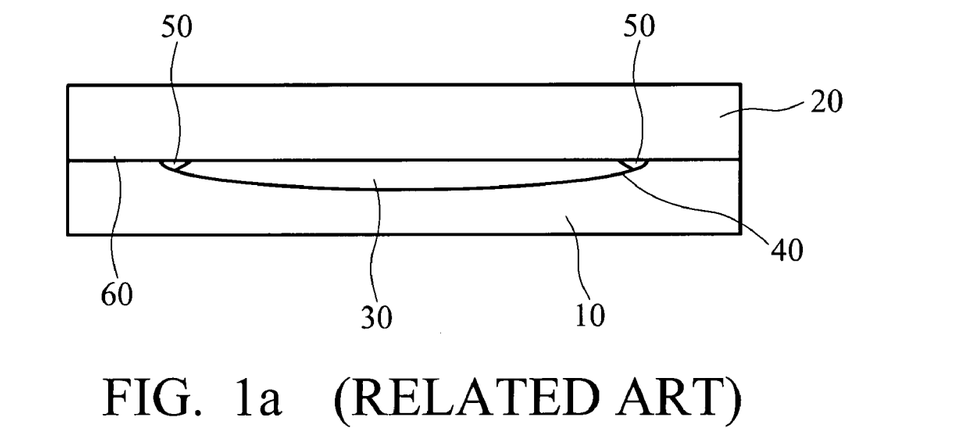
FIGS. 1a and 1b are cross sections of drawbacks of conventional fabrication of a micro-lens array substrate.
Figure 1B:
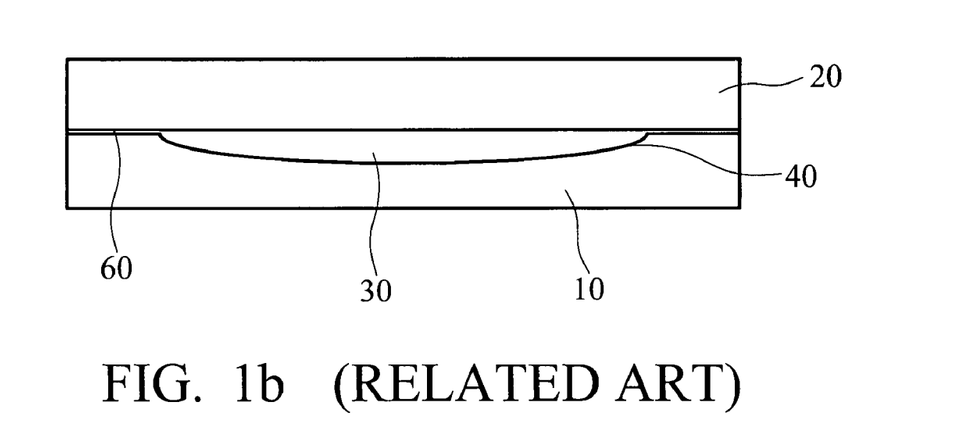

When fabricating an optical element such as a lens plate, the alignment between the optical element substrate and the lens mold is also important. Furthermore, in conventional fabrication of micro-lens array substrates, after glue is dispensed, the substrate is pressed upon the lens mold filled with epoxy glue to form a micro-lens. As shown in FIG. 1a, air bubbles 50 can occur if the epoxy glue 30 is insufficient within the cavity 40 of the lens mold 10, resulting in poor performance of the micro-lens. To the contrary, as shown in FIG. 1b, excess epoxy glue 30 can overflow 60 the cavity 40 of the lens mold 10.

Therefore, it is necessary to develop an optical microstructure plate to improve the alignment with optical element molds and other optical microstructure plates, and an optical element mold to solve the aforementioned problems.

BRIEF SUMMARY OF THE INVENTION

A detailed description is given in the following embodiments with reference to the accompanying drawings. These and other problems are generally solved or circumvented, and technical advantages are generally achieved, by preferred illustrative embodiments of the invention, which provide a display device.

Optical microstructure plates are provided. An exemplary embodiment of an optical microstructure plate comprises a substrate. An optical microstructure element is formed on the substrate. A period alignment mark is disposed on the substrate to provide alignment for fabricating the optical microstructure element by a mold. A universal alignment mark is disposed on the substrate to provide alignment for bonding another plate thereto.

Further, a mold for fabricating optical microstructure elements is also provided. An exemplary embodiment of an optical microstructure plate comprises a concave within a mold substrate. A spoiler is formed around the concave, and a buffer zone is formed adjacent to the spoiler. The spoiler facilitates air bubble or surplus glue introduction into the buffer zone.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense.

Figure 2:
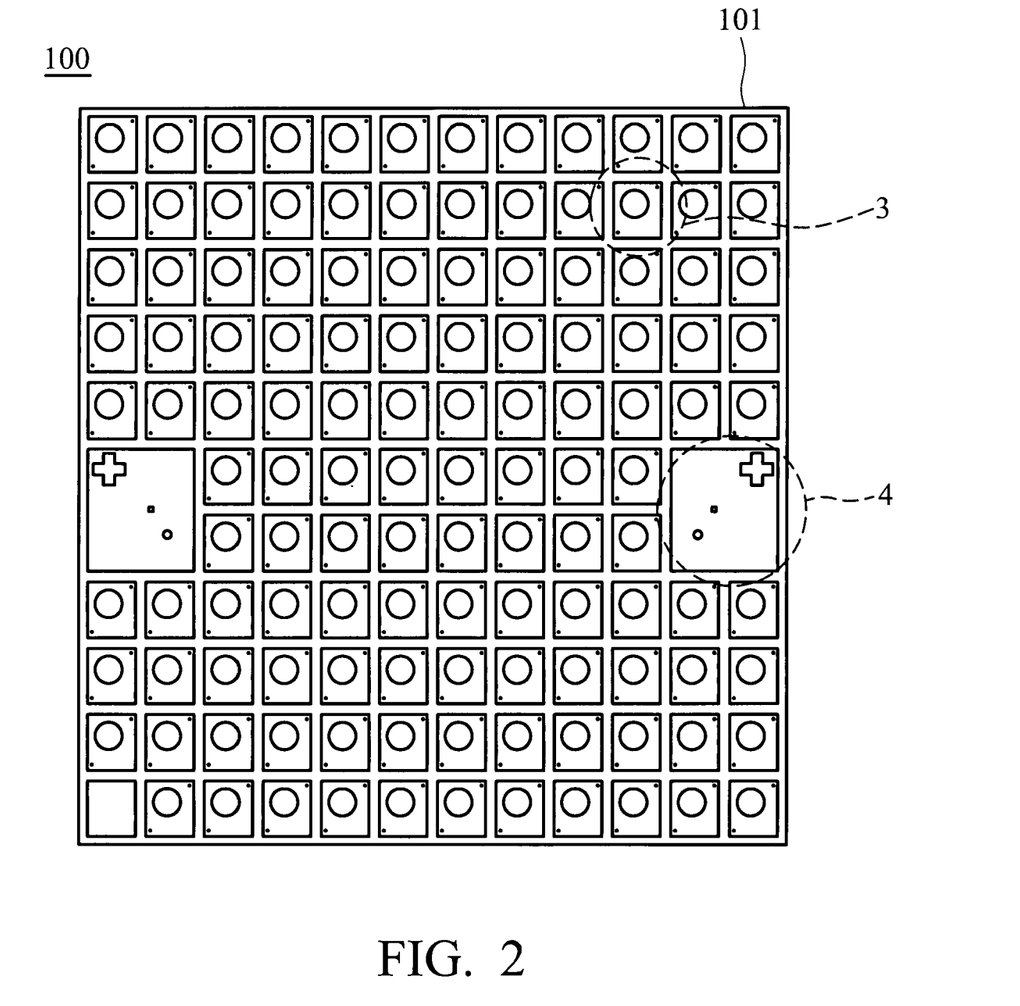
FIG. 2 is a schematic diagram of an optical microstructure plate according to an embodiment of the invention.
Figure 3:
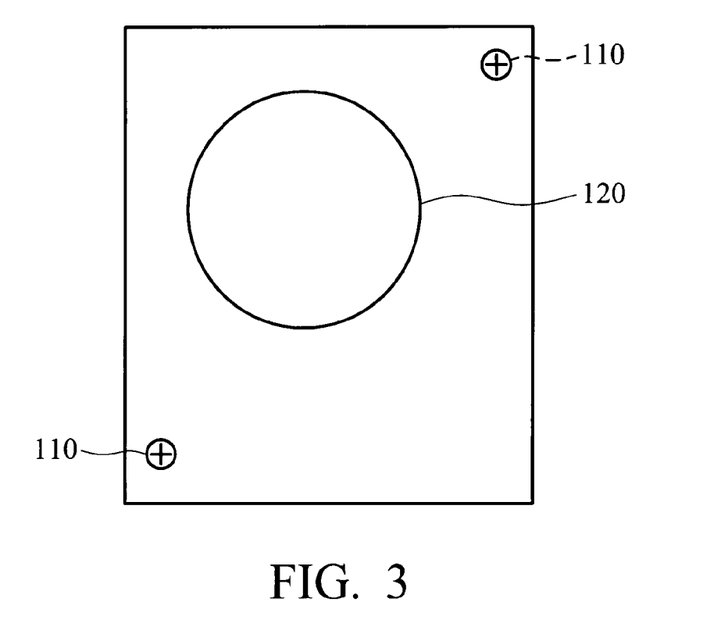
FIG. 3 is a close-up schematic diagram of location 3 in FIG. 2, illustrating the period alignment mark of the optical microstructure plate.

FIG. 2 is a schematic diagram of an optical microstructure plate 100 according to an embodiment of the invention. The optical microstructure plate 100 comprises a plurality of optical microstructure elements 120 arranged in a matrix formed on a substrate 101. FIG. 3 is a close-up schematic diagram of location 3 in FIG. 2. In FIG. 3, the optical microstructure plate 100 has a plurality of period alignment marks 110 providing alignment for fabricating the optical microstructure element 120, such as filters, diffractive elements, lens, or gratings, by a mold, such as a lens mold. It should be noted that the period alignment mark 110 can be triangular, square, polygonal, crossed, circular, or sawtoothed.

Figure 5:
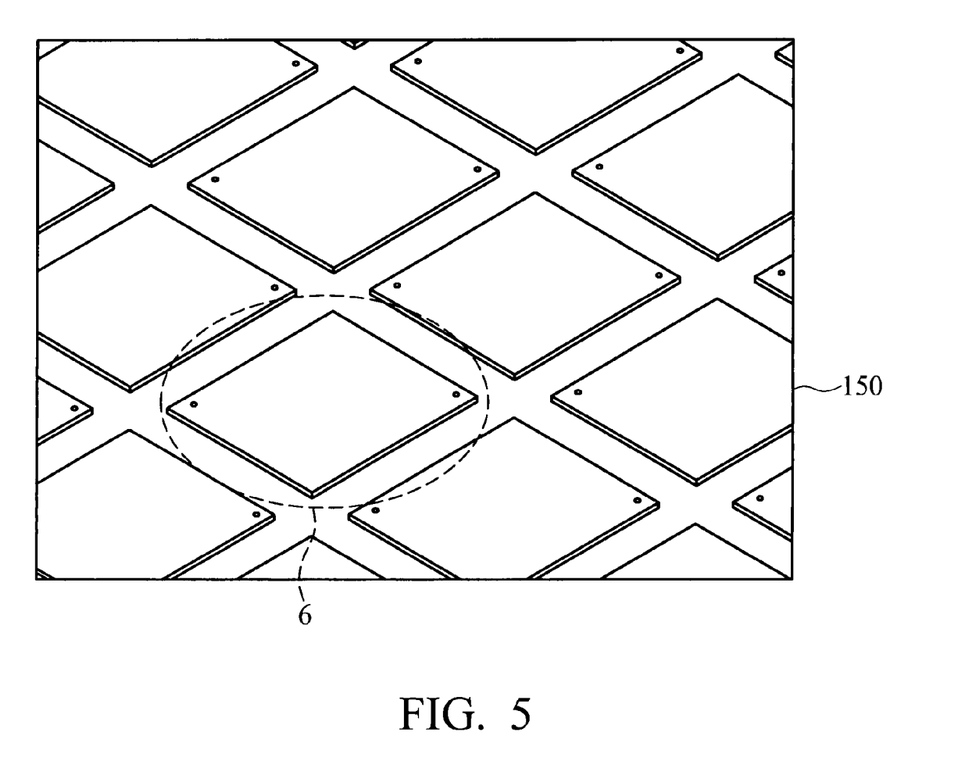
FIG. 5 is a schematic diagram of a lens mold of an embodiment of the invention.
Figure 6:
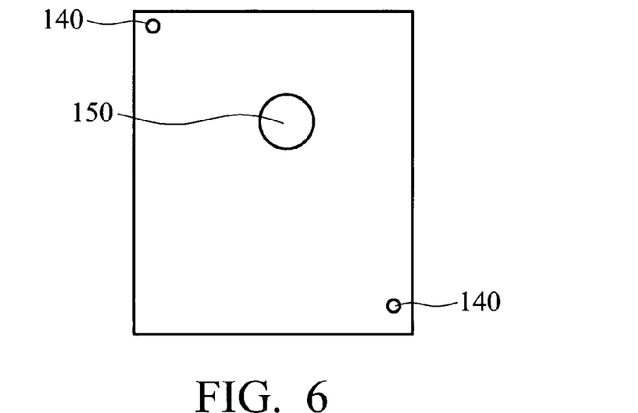
FIG. 6 is a close-up schematic diagram of location 6 in FIG. 5.

FIG. 5 is a schematic diagram of a lens mold 150, and FIG. 6 is: a close-up schematic diagram of location 6 in FIG. 5. The lens mold 150 has a plurality of alignment marks 140 corresponding to the period alignment marks 110 of the optical microstructure plate 100. The lens mold also has a concave 150 for forming the optical microstructure element 120 on the optical microstructure plate 100.

Figure 4:
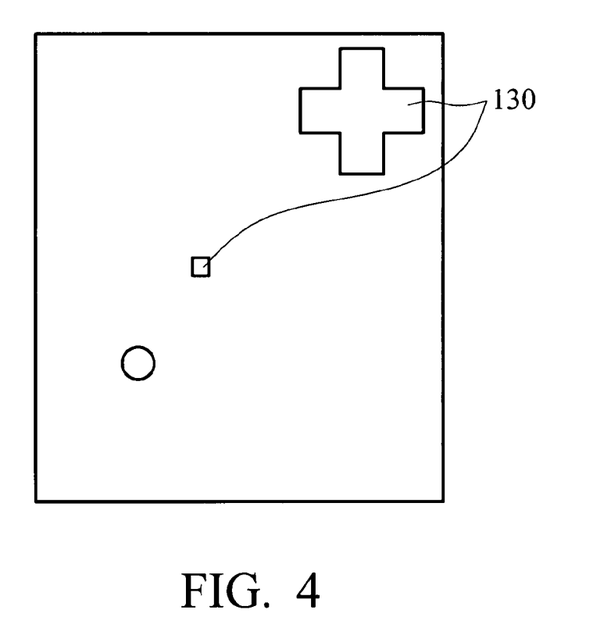
FIG. 4 is a close-up schematic diagram of location 4 in FIG. 2, illustrating the universal alignment mark of the optical microstructure plate.

As shown in FIG. 4, to accurately control alignment when bonding another plate, such as optical microstructure plate or support plate, with the optical microstructure plate 100, the optical microstructure plate 100 simultaneously has a plurality of universal alignment marks 130.

Figure 7:
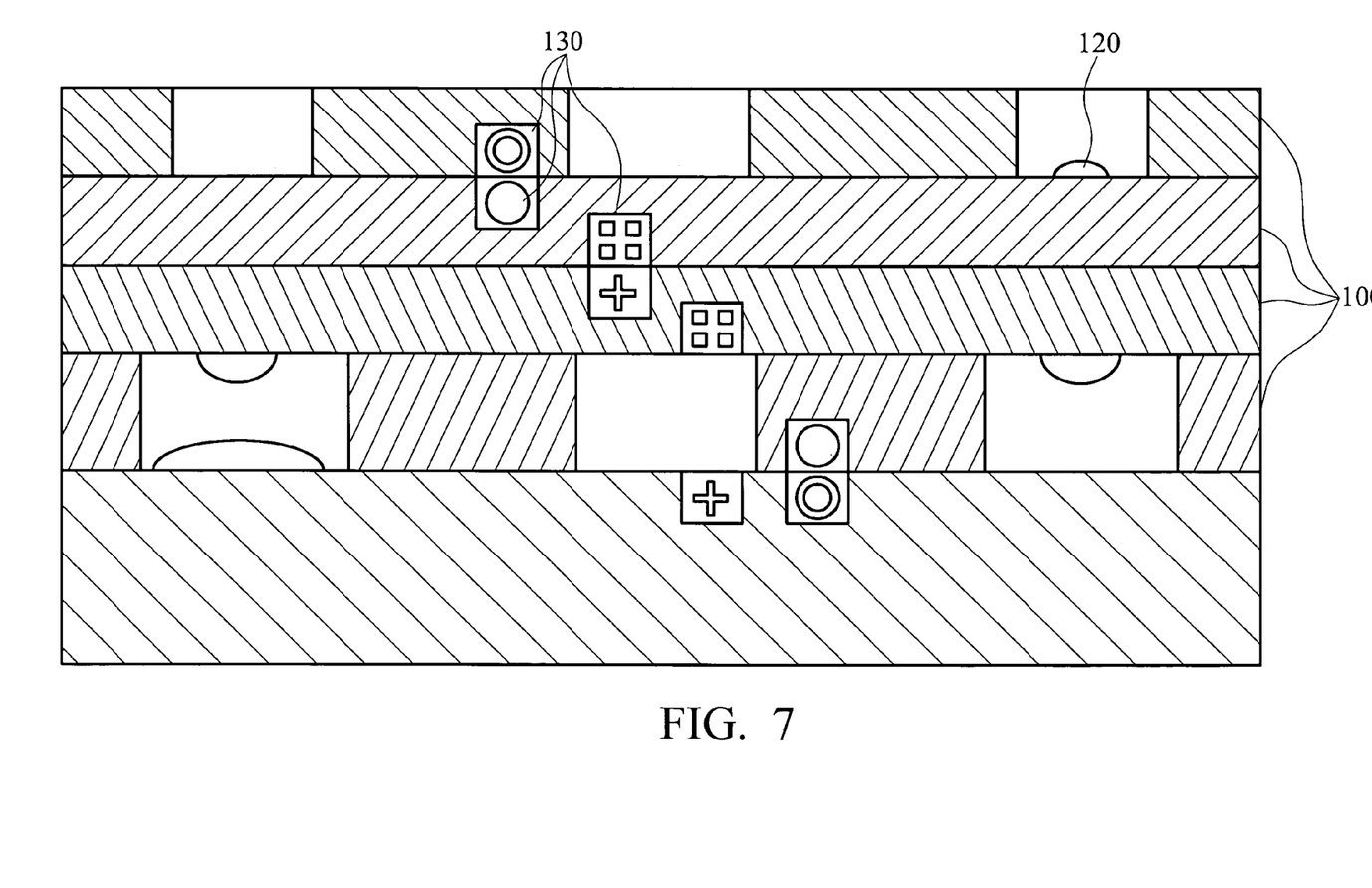
FIG. 7 is a schematic diagram showing the optical microstructure plates.

FIG. 7 shows a plurality of optical microstructure plates 100 being bonded. Advantageously, all plates include universal alignment marks 130 thereon, likely at an outer edge thereof, to ensure alignment of the wafers so that all the individual elements thereon are aligned simultaneously. It should be noted that period alignment mark 110 can be triangular, square, polygonal, crossed, circular, or sawtoothed.

Figure 8A:
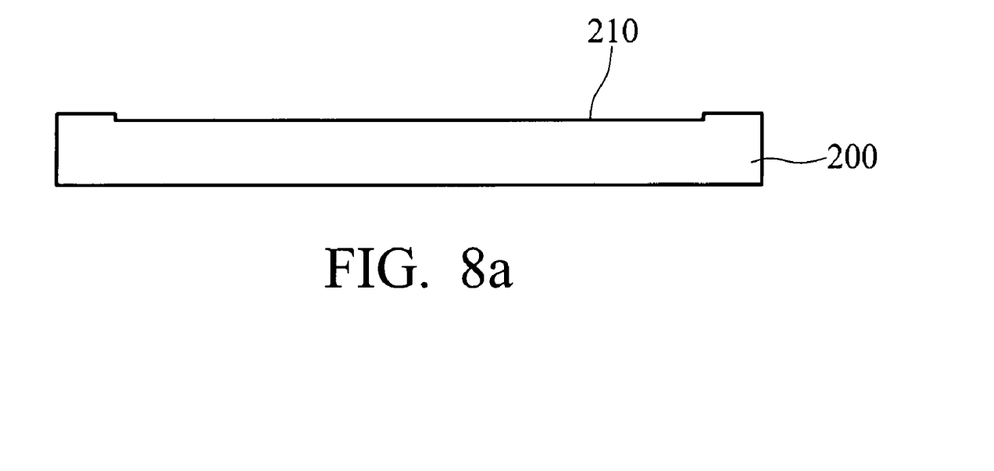
FIGS. 8a to 8c are cross sections of a method of fabricating a mold for fabricating optical microstructure elements according to an embodiment of the invention.

According to an embodiment of the invention, a mold for fabricating optical microstructure elements, such as filters, diffractive elements, lens, or gratings comprises providing a substrate 200, and removing a part of the substrate 200 to form an indentation 210, referring to FIG. 8a. Suitable material of the substrate can be glass, ceramic, or plastic. The indentation 210 can be formed by machining, dry etching, or wet etching.

Figure 8B:
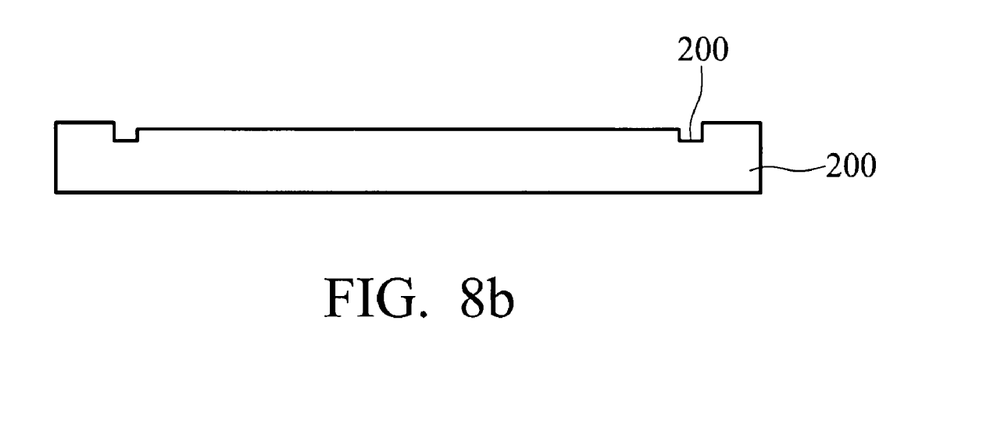

Referring to FIG. 8b, buffer zones 220 are formed on the substrate 200 by removing a part of the substrate 200 from the periphery of indentation 210. Next, referring to FIG. 8c, a part of the substrate 200 is removed to form a concave 230 and spoilers 240 therearound, obtaining the mold 250. It should be noted that the concave 230 is a shape forming tool to felicitate a lens-forming material, such as epoxy, silicone, or thermal plastic polymer, filled thereinto to have a specific shape after solidification. Further, the buffer zone 220 has a collection or storage structure for extra lens-forming material during optical microstructure element fabrication. Moreover, the spoiler 240 disposed between the buffer zone 22 and the concave 230 helps to avoid air bubbles. The profile of the spoiler 240 can be quadrilateral, ladder, or sawtooth.

Figure 9A:
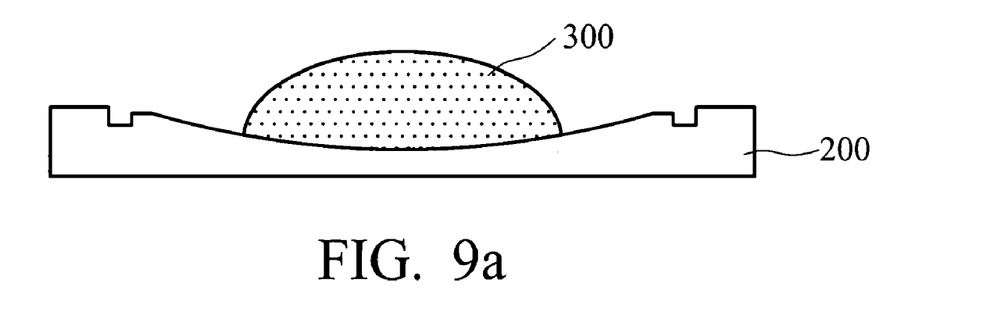
FIGS. 9a to 9c are cross sections showing a method of fabricating optical microstructure elements on a plate with the mold shown in FIG. 8c according to an embodiment of the invention.
Figure 9B:
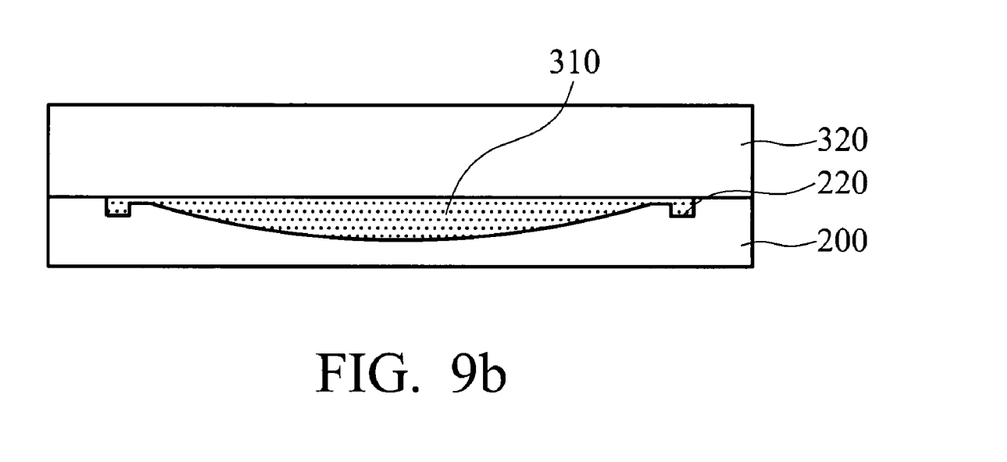
Figure 9C:
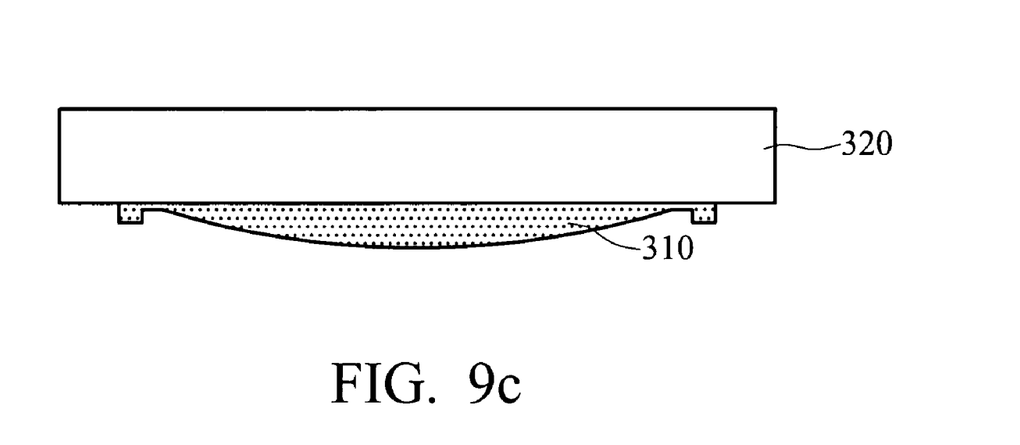

FIGS. 9a to 9c are cross sections of a process for forming an optical microstructure element on a plate with the mold according to an embodiment of the invention.

Figure 8C:
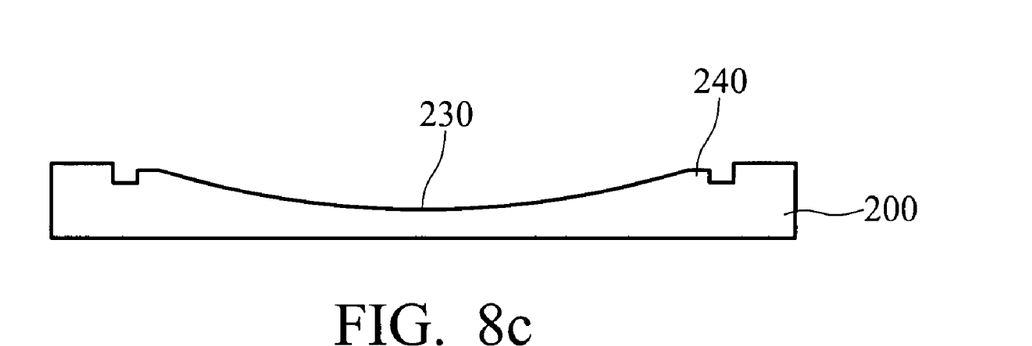

In FIG. 9a, a lens-forming material 300 is dispensed into the concave 230 of the mold 250 as shown in FIG. 8c, wherein the lens-forming material can be epoxy, silicone, or thermal plastic polymer. Next, a plate 320 is pressed onto the mold 250 and the lens-forming material 300 fills the cavity defined by the plate 320 and the mold 250. Herein, extra lens-forming material flows into the buffer zone 220 avoiding sag of the optical microstructure element. and avoiding occurrence of air bubbles during plate pressing. Next, the lens-forming material 300 is irradiated with UV light or subjected to a thermal treatment to solidify and form the optical microstructure element 310. Finally, the mold 250 is left to the optical microstructure 310 on the plate 320.

Accordingly, the mold provided by embodiments of the invention can allow more lens-forming material 300 dispensed to the mold without the risk of air bubble or sag of the optical microstructure element.

While the invention has been described by way of example and in terms of preferred embodiment, it is to be understood that the invention is not limited-thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical microstructure plate, comprising:
    a substrate;
    an optical microstructure element formed on the substrate;
    a period alignment mark disposed on the substrate to provide alignment for fabricating the optical microstructure element by a mold; and
    a universal alignment mark disposed on the substrate to provide alignment for bonding another plate therewith.
2. The optical microstructure plate as claimed in claim 1, wherein the optical microstructure element comprises filters.
3. The optical microstructure plate as claimed in claim 1, wherein the optical microstructure element comprises diffractive elements.
4. The optical microstructure plate as claimed in claim 1, wherein the optical microstructure element comprises lenses.
5. The optical microstructure plate as claimed in claim 1, wherein the optical microstructure element comprises gratings.
6. The optical microstructure plate as claimed in claim 1, wherein the period alignment mark or universal alignment mark is triangular.
7. The optical microstructure plate as claimed in claim 1, wherein the period alignment mark or universal alignment mark is square.
8. The optical microstructure plate as claimed in claim 1, wherein the period alignment mark or universal alignment mark is polygonal.
9. The optical microstructure plate as claimed in claim 1, wherein the period alignment mark or universal alignment mark is crossed.
10. The optical microstructure plate as claimed in claim 1, wherein the period alignment mark or universal alignment mark is circular.
11. The optical microstructure plate as claimed in claim 1, wherein the period alignment mark or universal alignment mark is sawtoothed.
12. The optical microstructure plate as claimed in claim 1, wherein the mold is used for fabricating optical microstructure element and comprises:
    a concave within a mold substrate;
    a spoiler around the concave; and
    a buffer zone adjacent to the spoiler.

* * * * *